(12) United States Patent
Weldy

(10) Patent No.: US 6,681,042 B1
(45) Date of Patent: Jan. 20, 2004

(54) DIGITAL COLOR IMAGE PROCESSING METHOD

(75) Inventor: John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 666 days.

(21) Appl. No.: 09/650,422

(22) Filed: Aug. 29, 2000

(51) Int. Cl.$^7$ .................................................. G06K 9/00
(52) U.S. Cl. ..................... 382/167; 358/1.9; 358/80; 358/296; 348/180; 348/223
(58) Field of Search ..................... 382/135, 162–167, 382/274–275, 312–324; 345/589–591, 618–620, 625–628; 358/515–523, 1.9, 2.1, 3.01, 3.26; 194/4; 902/7

(56) References Cited

U.S. PATENT DOCUMENTS

| | | | |
|---|---|---|---|
| 4,677,465 A | 6/1987 | Alkofer | 358/80 |
| 4,729,016 A | 3/1988 | Alkofer | 358/80 |
| 4,984,071 A | 1/1991 | Yonezawa | 358/80 |
| 5,062,058 A | 10/1991 | Morikawa | 364/521 |
| 5,150,199 A * | 9/1992 | Shoemaker et al. | 348/180 |
| 5,265,200 A | 11/1993 | Edgar | 395/131 |
| 5,537,516 A * | 7/1996 | Sherman et al. | 358/1.9 |
| 5,539,522 A * | 7/1996 | Yoshida | 358/296 |
| 5,555,022 A | 9/1996 | Haruki et al. | 348/223 |
| 5,673,336 A | 9/1997 | Edgar et al. | 382/167 |
| 5,796,874 A | 8/1998 | Woolfe et al. | 382/254 |
| 5,812,286 A | 9/1998 | Lin | 358/519 |

OTHER PUBLICATIONS

Graham D. Finlayson et al., "Constrained Least–Squares Regression in Color Spaces," J. Electronic Imaging, Oct. 1997, vol. 6(4), pp. 484–493.*

Binh Pham et al., "Color Correction for an Image Sequence," IEEE Computer Graphics and Applications, May 1995, pp. 38–42.*

* cited by examiner

*Primary Examiner*—Bhavesh M. Mehta
*Assistant Examiner*—Yubin Hung
(74) *Attorney, Agent, or Firm*—Thomas H. Close

(57) ABSTRACT

A method of processing a digital color image having pixels and a plurality of color channels, including the steps of: generating a reference image from the digital color image; regressing the color channels of the digital color image to the reference image to obtain a plurality of regression factors for each color channel; and applying the regression factors on a pixel by pixel basis to the respective channels of the digital color image to produce a processed digital color image.

36 Claims, 3 Drawing Sheets

DIGITAL COLOR IMAGE PROCESSING METHOD

FIELD OF THE INVENTION

The present invention relates to methods of processing digital color images, and more particularly to a method of adjusting the color of a digital color image.

BACKGROUND OF THE INVENTION

In photographic printing of film, such as a color photographic negative, it is a well known practice to 'correct' the color balance by causing the overall color balance of the print to be a shade near gray. This correction strategy is based on the assumption that the overall average of the scene integrates to a gray color and is very effective at reducing the effects resulting from different scene illuminants that are spectrally different such as tungsten and daylight. In a like manner, image sensing apparatus such as a video camera, average, over a time period, color difference signals, R–Y and B–Y, to a zero value. This is equivalent to integrating to gray.

These methods work well for the majority of scene and illuminant combinations. However, when the scene subject matter is highly colored, particularly with a single dominant color, the integrate to gray strategy fails as this dominant scene color is mistaken for an illuminant bias. This failure, known as subject failure, produces unpleasant color casts in the color complimentary to the dominant scene color. There are various strategies for minimizing these failures. These strategies are typically based on reducing the amount of correction based on a population of images and/or on the information in neighboring frames. Other color problems result from fading of the dyes in a photographic image, printing and processing errors, film keeping problems, and in the case of a color digital image that is captured directly with an electronic camera, a misadjusted black point in the camera.

With a digital image obtained either directly from an electronic camera or indirectly by scanning a photographic print or film, it is possible to manually adjust the color balance by using any of the well known digital photographic manipulation tools such as Adobe Photoshop®. However, manual adjustment is not practical for automated printing of digital images. A digital image provides much information that can be used for calculating color adjustments, and several methods have been proposed for performing these adjustments automatically. Some of these methods, such as that taught in U.S. Pat. No. 5,555,022 issued Sep. 10, 1996 to Haruki et al., divide the scene information into a plurality of regions representing different locations within a scene. Means to select and weight the correction of these blocks are then employed to provide automatic white balancing and to restrict the degree to which color correction gain is applied. U.S. Pat. No. 4,984,071 issued Jan. 8, 1991 to Yonezawa teaches a method for adjusting a gradation curve based on identifying shadow and highlight points by utilizing histogram data. U.S. Pat. No. 5,062,058 issued Oct. 29, 1991 to Morikawa describes a system that uses a cumulative histogram to designate highlight and shadow points. Other histogram based methods are taught by: U.S. Pat. No. 5,812,286 issued Sep. 22, 1998 to Lin, and U.S. Pat. No. 5,265,200 issued Nov. 23, 1993 to Edgar. Edgar further describes a method performing a second order best fit regression of the histogram data and includes methods to eliminate some histogram values from consideration in the regression.

Another approach that combines color correction with tone scale corrections is based on random sampling within a digitized image and subsequently modifying the resulting histogram of these samples. U.S. Pat. No. 4,677,465 issued Jun. 30, 1987 to Alkofer, and U.S. Pat. No. 4,729,016 issued Mar. 1, 1988 to Alkofer, disclose relatively complex methods that utilize these samples in a plurality of segmented contrast intervals through normalization techniques and with comparison to image population data.

An approach that is specifically designed to correct for dye-fade in Ektacolor paper involves generating a 3×3 restoration matrix. The matrix is a matrix of coefficients of second order polynomials in time, with constants that are optimized for specific paper, and are applied in logarithmic space, which compensate for the image-wise light filtration from overlying layers in the film. The compensation matrix is followed by tone-scale adjustments; see U.S. Pat. No. 5,796,874 issued Aug. 18, 1998 to Woolfe et al. To date, none of these prior art techniques have proven entirely satisfactory in addressing the problem of automatically adjusting color in a digital image, particularly where the digital image has been derived by scanning an image that has experienced severe dye fade.

In addition, many of the above cited histogram methods only utilize a fraction of the image data near the ends of the histogram data. Furthermore, individual color channel histograms do not maintain any linkage of channel information at the pixel level. In other words, unless the image is monochrome, the pixels for a particular level in the histogram for one channel correspond to many levels in the other channels. This lack of linkage can cause errors with the above described histogram methods, particularly when there are highly saturated colors and when there is clipping of the image data.

There is a need therefore for an improved digital image processing method for automatically adjusting the color balance of a digital image.

SUMMARY OF THE INVENTION

The need is met according to the present invention by providing a method of processing a digital color image having pixels and a plurality of color channels that includes the steps of: generating a reference image from the digital color image; regressing the color channels of the digital color image to the reference image to obtain a plurality of regression factors for each color channel; and, applying the regression factors on a pixel by pixel basis to the respective channels of the digital color image to produce a processed digital color image.

The present invention has the advantages that it utilizes all of the image pixels in a manner that retains image data linkage at the pixel level, provides both gain and offset terms required to correct severe color biases such as those resulting from long term keeping of color dye images, and can be easily combined with masking techniques to further improve performance.

DETAILED DESCRIPTION OF THE INVENTION

Figure 1:
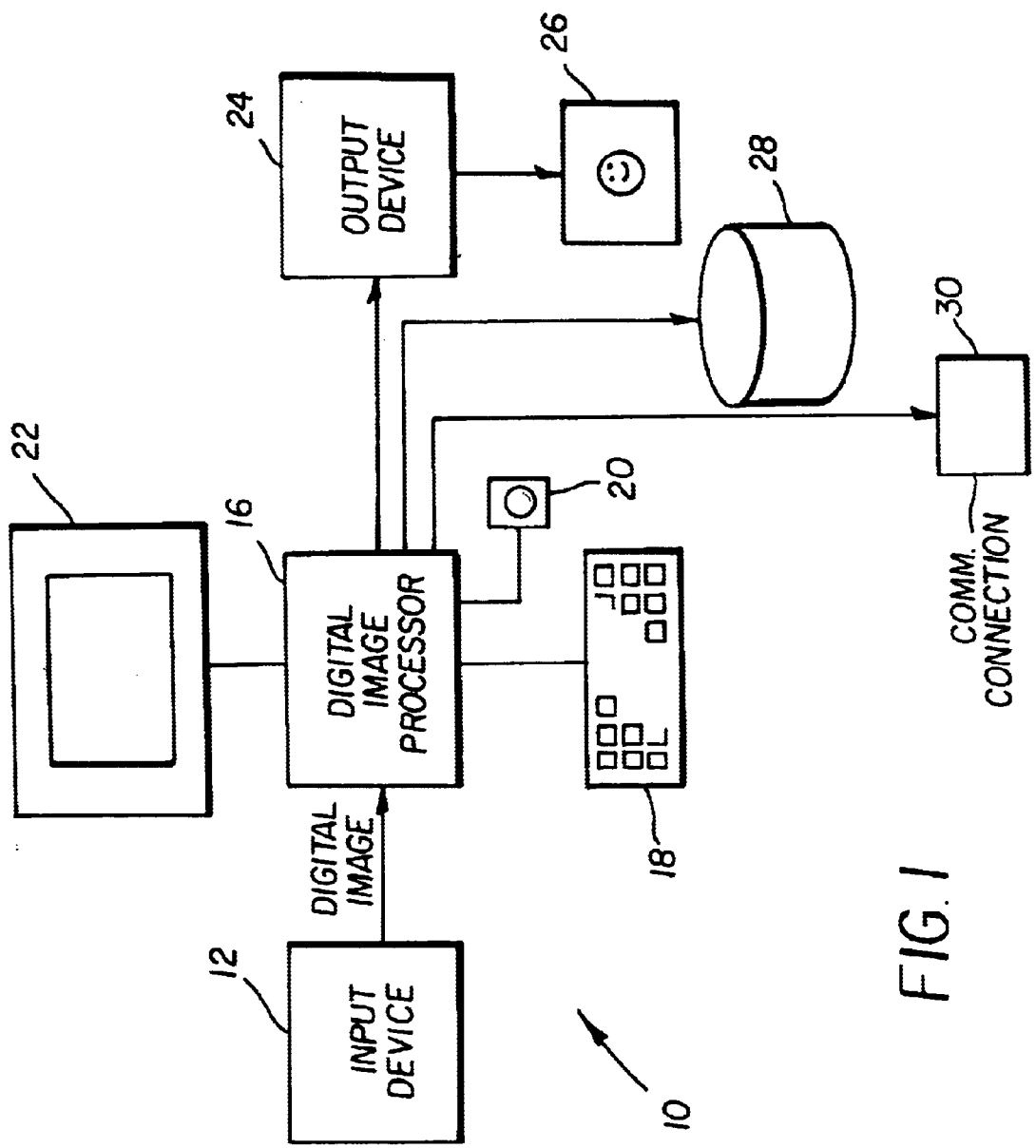
FIG. 1 is a schematic block diagram illustrating an image processing system suitable for performing the image processing method of the present invention.

Referring to FIG. 1, an image processing system, generally designated 10 suitable for performing the image processing method of the present invention includes for example an input device 12 for producing a digital image, such as a scanner for scanning photographic film or prints, or a digital camera. Alternatively, digital images may be sourced from a digital data storage device and accessed via the World Wide Web. The input device 12 produces a digital image signal having a plurality of color channels (e.g. red, green and blue) that is supplied to a digital image processor 16. The digital image processor is a programmed computer and can be for example a general purpose digital computer such as a PC, or minicomputer, or a computer that is specially designed for processing digital images. The digital image processor 16 is provided with operator interface devices such as a keyboard 18 and a mouse 20. The system 10 may include display devices, connected to the digital image processor 16, such as a color monitor 22 and a output device 24, such as a color hardcopy printer (e.g. an ink jet or thermal printer) for producing a color hard copy print 26 of the processed digital image. The system may also include a digital image store 28, such as an optical disk storage unit for storing the processed images, and a communications connection 30, such as a modem, for communicating the images to a remote location.

Figure 2:
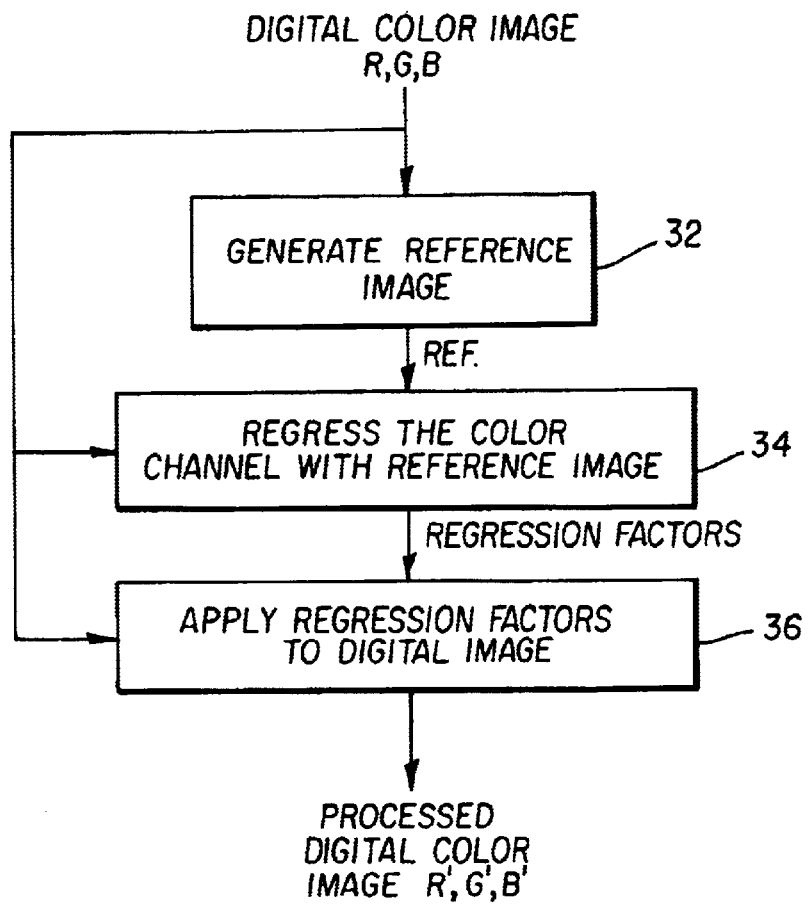
FIG. 2 is a schematic diagram illustrating the digital image processing method according to the present invention.

Referring to FIG. 2, the image processing method of the present invention includes the steps of generating 32 a reference image from the digital color image. The reference image is generated, for example by forming a linear combination of the color components of the color image. In general, when the image has red, green, and blue color components, the reference image $W_{i,j}$ is generated as follows:

$$W_{i,j} = C_1 \times r_{i,j} + C_2 \times g_{i,j} + C_3 \times b_{i,j} \qquad \text{Eq. (1)}$$

Where $C_1$, $C_2$, and $C_3$ are positive or zero valued constants and $r_{i,j}$, $g_{i,j}$, and $b_{i,j}$ are the values for the pixel located at coordinates i,j of the red, green, and blue digital color image channels. The constants $C_1$, $C_2$, and $C_3$ can be set to sum to unity, for example ⅓, ⅓, and ⅓, whereby if the code values of each channel of the digital image range from 0 to 255, the pixels of the reference image will be likewise restricted to range from 0 to 255, thereby facilitating further processing.

Figure 3:
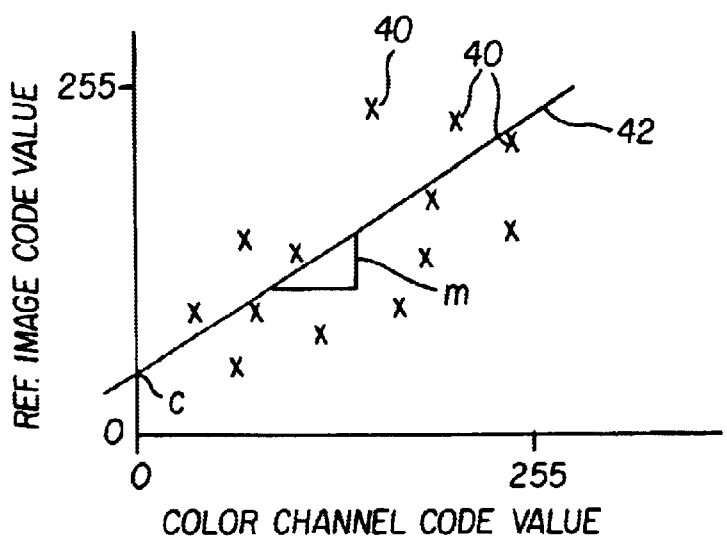
FIG. 3 is a plot useful in describing the step of regressing a digital color image to a reference image according to the present invention.

Next, each color channel is regressed 34 with the reference image to produce a plurality of regression factors for each color channel. As shown in FIG. 3, a plot of reference image code values versus code values for a given color channel for each pixel results in a plot of points 40. A regression on the points 40 can be, for example, a simple linear regression 42. In this case, the resulting regression factors are a slope m and intercept c for each color channel. The slope m can be interpreted as a gain factor and the intercept c as an offset bias to a tonescale mapping of an image channel. Finally, the regression factors are applied 36 to the color channels of the digital image to produce the processed digital image. In the example where the regression factors are gains and offsets, the regression factors are applied to the color channels of the digital image by simply multiplying the pixel values by the respective gains m and adding the offsets c as follows:

$$r_{i,j}' = m_r \times r_{i,j} + c_r \qquad \text{Eq. (2)}$$

$$g_{i,j}' = m_g \times g_{i,j} + c_g \qquad \text{Eq. (3)}$$

$$b_{i,j}' = m_b \times b_{i,j} + c_b \qquad \text{Eq. (4)}$$

Where $r_{i,j}$, $g_{i,j}$, and $b_{i,j}$ are the values for the pixel located at coordinates i,j of the red, green and blue digital color image channels respectively, and $r_{i,j}'$, $g_{i,j}'$, and $b_{i,j}'$ are the processed values. Processing a digital image according to the present invention has the effect of reducing color errors caused by a variety of mechanisms. Color errors resulting from non-daylight type scene illuminant biases, for example, tungsten light exposure or underwater exposure can be automatically corrected. Other color errors, such as those resulting from long term keeping of color dye images benefit from this color correction that allows, in the case of the above described linear model, from both gain and offset correction. Other situations, such as those described in the above noted prior art where black and white point adjustment are desired, can be automatically realized with this linear model that provides gain and offset correction.

Alternatively, to improve processing efficiency, the digital image may be subsampled and the reference image formation and regression performed on the subsampled image to produce the regression factors. The regression factors are then applied to the full non-subsampled image.

Figure 4:
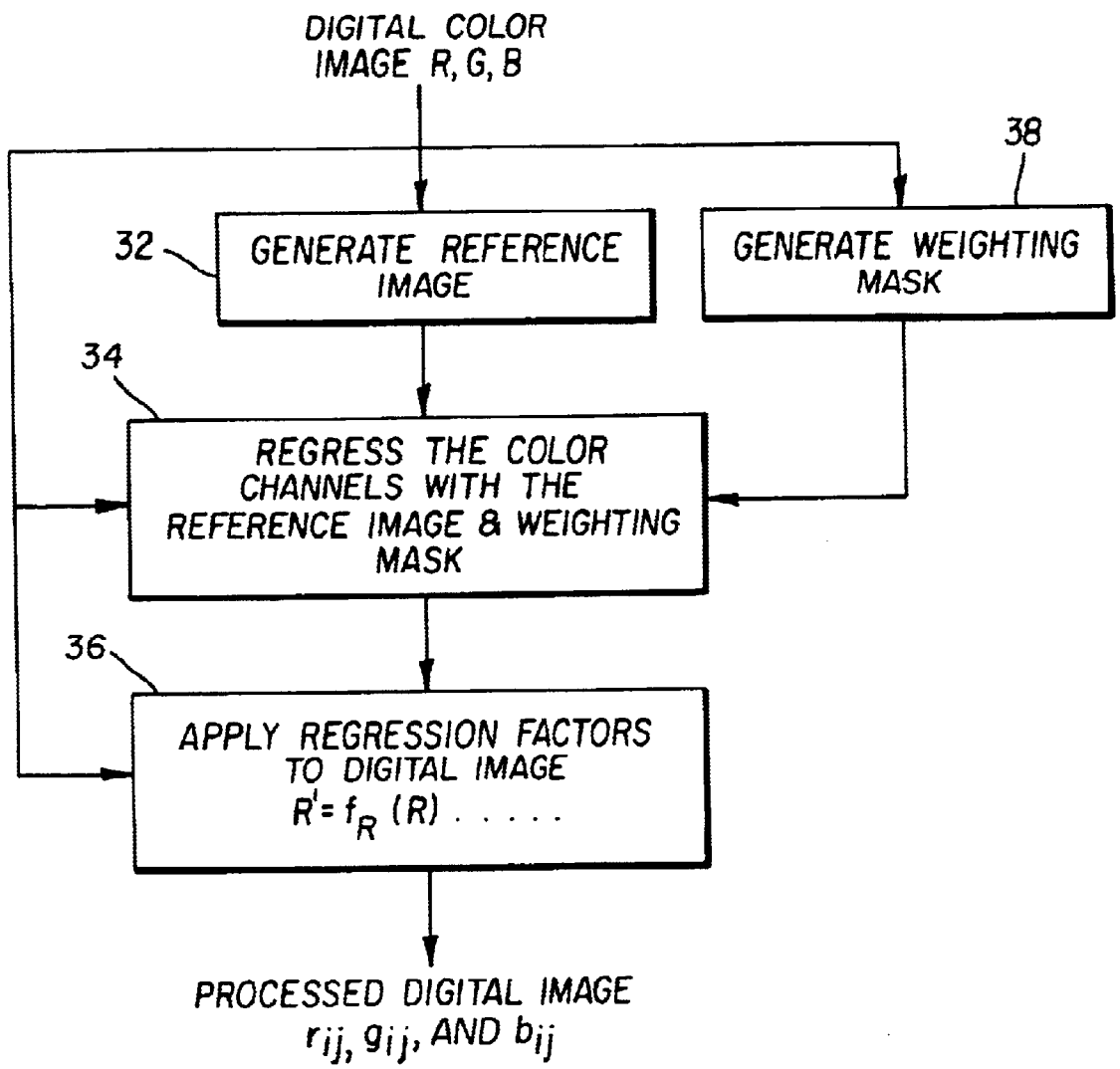
FIG. 4 is a schematic diagram illustrating a further embodiment of the present invention employing a weighting mask.

Using the simple implementation of the invention as described above, the digital images of scenes having a dominant color can be adversely modified. This is commonly referred to a subject color failure. This problem is addressed in a preferred embodiment of the present invention by deriving a weighting mask from the digital color image and applying the weighting mask during the regression. Referring to FIG. 4, a flow chart illustrating the method of the present invention using the weighting mask is shown. One or more weighting masks are generated 38, for example, by identifying pixels that are clipped, or that have high color saturation, and assigning a weighting of less than one (e.g. 0) for such pixels. The color channels are then regressed with the reference image subject to the weighting mask(s) to generate regression factors for each channel. The regression factors are then applied 36 to each channel of the image to produce the processed digital image $r_{i,j}'$, $g_{i,j}'$, $b_{i,j}'$.

In the preferred embodiment the image processing is conducted in a power law color space such as the color space defined in CCIR recommendation 709 Basic Parameter Values for the HDTV standard for Studio and for International Progamme Exchange.

One example of the regression step 34 can be described in detail as follows. A set of gains $M_{r,g,b}$ and offsets $c_{r,g,b}$ are generated as shown below. This step will be referred to herein as regressing the color components to the reference image, and is described by the following equations.

$$m_r = \frac{\overline{rw} - (\overline{w} \times \overline{r})}{\overline{r^2} - (\overline{r} \times \overline{r})}, \qquad c_r = \overline{w} - (m_r \times \overline{r}) \qquad \text{Eq. (5)}$$

$$m_g = \frac{\overline{gw} - (\overline{w} \times \overline{g})}{\overline{g^2} - (\overline{g} \times \overline{g})}, \qquad c_g = \overline{w} - (m_g \times \overline{g}) \qquad \text{Eq. (6)}$$

$$m_b = \frac{\overline{bw} - (\overline{w} \times \overline{b})}{\overline{b^2} - (\overline{b} \times \overline{b})}, \qquad c_b = \overline{w} - (m_b \times \overline{b}), \qquad \text{Eq. (7)}$$

where $$\bar{r} = \frac{\sum_{i,j} r_{i,j} \times \prod_k M_{k,i,j}}{N}, \bar{g} = \frac{\sum_{i,j} g_{i,j} \times \prod_k M_{k,i,j}}{N},$$

$$\bar{b} = \frac{\sum_{i,j} b_{i,j} \times \prod_k M_{k,i,j}}{N}, \text{ and } \bar{w} = \frac{\sum_{i,j} w_{i,j} \times \prod_k M_{k,i,j}}{N};$$

$$\overline{rw} = \frac{\sum_{i,j} r_{i,j} \times w_{i,j} \times \prod_k M_{k,i,j}}{N}, \overline{gw} = \frac{\sum_{i,j} g_{i,j} \times w_{i,j} \times \prod_k M_{k,i,j}}{N},$$

$$\text{and } \overline{bw} = \frac{\sum_{i,j} b_{i,j} \times w_{i,j} \times \prod_k M_{k,i,j}}{N}; \overline{r^2} = \frac{\sum_{i,j} r_{i,j} \times r_{i,j} \times \prod_k M_{k,i,j}}{N},$$

$$\overline{g^2} = \frac{\sum_{i,j} g_{i,j} \times g_{i,j} \times \prod_k M_{k,i,j}}{N}, \overline{b^2} = \frac{\sum_{i,j} b_{i,j} \times b_{i,j} \times \prod_k M_{k,i,j}}{N};$$

N is the number of pixels used in the regression; $M_{k,i,j}$ is the weighting factor for the $k^{th}$ mask at pixel location i,j; and $\prod$ indicates the product of the k masks $M_{k,i,j}$.

Alternatively, if there is more than one weighting mask, combination methods other than the product, for example a sum, can be used. By applying various weighting masks, the performance of the above described method is enhanced. Example masks include masks that exclude pixels with clipped values. An example of a clipping exclusion mask is:

For all i,j
If(r(i,j)>rcliphigh OR g(i,j)>gcliphigh OR b(i,j)>bcliphigh OR r(i,j)<rcliplow
OR g(i,j)<gcliplow OR b(i,j)<bcliplow)
then $M_{i,j}$=0
else $M_{i,j}$=1, where rcliphigh and rcliplow are high and low threshold values, respectively, indicating the range of useful pixel values in the red channel, and similarly for the green and blue channels.

In addition, excluding or weighting pixels with high color saturation can enhance performance. Defining saturation at each pixel S(i,j)

$$S(i,j)=\text{sqrt}((r(i,j)-g(i,j))^{}2+(r(i,j)-b(i,j))^{}2+(g(i,j)-b(i,j))^{**}2)$$

Then an example saturation mask with continuous weighting from 0 to 1 is:

$$M(i,j)=2*Smin/(Smin+S(i,j))$$

Where Smin is a minimum saturation greater than zero. Alternatively, pixels may be excluded based on a saturation threshold:

If(S(i,j)>St
Then M(i,j)=0
Else
M(i,j)=1
Where St is a threshold saturation.

In addition to the above detailed examples of masks, other masks based on spatial frequency content or other digital image processing of pixel data, image statistics and the like, can be used to further improve the performance of the method.

The method of the present invention can be further improved by considering the ratio of how well the reference image predicts the unprocessed channels of the digital image to how well it predicts the processed channels of the digital image, and how large of a color correction is calculated to further adjust the aggressiveness of the final color correction by modifying the regression factors that are applied to the digital color image. For example, if the ratio is large the final color correction can be very aggressive, i.e. all of the calculated color correction can be applied. However, if the ratio is small, aggressive color correction is indicated only when a small color correction has been calculated.

The present invention is useful, for example, for correcting the color reproduction of images that have experienced dye fading, images that were exposed under water or with tungsten or fluorescent illumination using daylight balanced film, or images derived from photographic prints that were incorrectly printed. After the digital image has been processed according to the present invention, it may be further processed, for example, by applying further tone scale adjustment algorithms. It can also be further processed by applying a color matrixing operation of the type disclosed in U.S. Pat. No. 5,673,336 issued Sep. 30, 1997 to Edgar et al., wherein a matrix is determined by crosscolor correlations from noise patterns identified in the image.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example: magnetic storage media such as a magnetic disc (e.g. a floppy disc) or magnetic tape; optical storage media such as optical disc or optical tape; bar code; solid state electronic storage devices such as random access memory (RAM)or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image processing system
12 input device
16 digital image processor
18 keyboard
20 mouse
22 color monitor
24 output device
26 color hardcopy print
28 digital image store
30 communications connection
32 generating reference image step
34 regression step
36 apply regression factors step
38 generate weighting mask step
40 plot of points
42 linear regression line

What is claimed is:

1. A method of processing a digital color image having pixels and a plurality of color channels, comprising the steps of:

a) generating a reference image from the digital color image;

b) regressing the color channels of the digital color image to the reference image to obtain a plurality of regression factors for each color channel; and c) applying the regression factors on a pixel by pixel basis to the respective channels of the digital color image to produce a processed digital color image.

2. The method claimed in claim 1, wherein the regression is a linear regression, the regression factors are a slope and intercept applied to the color channels as a gain and offset.

3. The method claimed in claim 2, wherein the color channels are red, green and blue.

4. The method claimed in claim 1, further comprising the step of transforming the digital color image to a power law space prior to generating the reference image and performing the subsequent steps in the power law space.

5. The method claimed in claim 1, further comprising the step of generating one or more weighting masks from the digital color image and applying the weighting mask(s) during the regressing step.

6. The image processing method claimed in claim 5, wherein a weighting mask is a clip mask.

7. The image processing method claimed in claim 5, wherein a weighting mask is a saturation mask.

8. The image processing method claimed in claim 3 wherein the slope and intercept are applied as follows:

$$r_{i,j}' = m_r \times r_{i,j} + c_r$$

$$g_{i,j}' = m_g \times g_{i,j} + c_g$$

$$b_{i,j}' = m_b \times b_{i,j} + c_b,$$

where $r_{i,j}$, $g_{i,j}$, and $b_{i,j}$ are the values for the pixel located at coordinates i,j of the red, green and blue digital color image channels respectively and $r_{i,j}'$, $g_{i,j}'$, and $b_{i,j}'$ are the processed values.

9. The image processing method claimed in claim 1, wherein the reference image is a linear combination of the color channels.

10. The image processing method claimed in claim 9, wherein the linear combination is expressed as $$W_{i,j} = C_1 \times r_{i,j} + C_2 \times g_{i,j} + C_3 \times b_{i,j},$$

where $C_1$, $C_2$, and $C_3$ are positive or zero valued constants and $r_{i,j}$, $g_{i,j}$, and $b_{i,j}$ are the values for the pixel located at coordinates i,j of the red, green; and blue digital color image channels.

11. The image processing method claimed in claim 9, wherein $C_1$, $C_2$, and $C_3$ sum to unity.

12. The image processing method claimed in claim 10, wherein $C_1$, $C_2$, and $C_3 = \frac{1}{3}$.

13. The image processing method claimed in claim 7, wherein the saturation mask is a mask for excluding pixels from the digital image that have a high color saturation.

14. The image processing method claimed in claim 1, further comprising the step of modifying the regression factors as a function of the ratio of how well the reference image predicts the unprocessed channels of the digital image to how well it predicts the processed channels of the digital image, and how large of a color correction is calculated to further adjust the aggressiveness of the final color correction.

15. The image processing method claimed in claim 1, further comprising the step of further processing the processed digital image to adjust tone scale.

16. The image processing method claimed in claim 1, further comprising the step of applying a color matrixing operation to the processed image.

17. The image processing method claimed in claim 16, wherein a color matrix employed in the matrixing operation is determined by crosscolor correlations from noise patterns identified in the image.

18. The image processing method claimed in claim 1, further comprising the steps of subsampling the digital color image prior to generating the reference image, and performing the steps of generating and regressing on the subsampled digital image.

19. A computer program product for performing the method of claim 1.

20. A computer program product for performing the method of claim 2.

21. A computer program product for performing the method of claim 3.

22. A computer program product for performing the method of claim 4.

23. A computer program product for performing the method of claim 5.

24. A computer program product for performing the method of claim 6.

25. A computer program product for performing the method of claim 7.

26. A computer program product for performing the method of claim 8.

27. A computer program product for performing the method of claim 9.

28. A computer program product for performing the method of claim 10.

29. A computer program product for performing the method of claim 11.

30. A computer program product for performing the method of claim 12.

31. A computer program product for performing the method of claim 13.

32. A computer program product for performing the method of claim 14.

33. A computer program product for performing the method of claim 15.

34. A computer program product for performing the method of claim 16.

35. A computer program product for performing the method of claim 17.

36. A computer program product for performing the method of claim 18.

* * * * *